March 2, 1937. A. G. S. SANDISON 2,072,220
FLUID FLOW METER
Filed Aug. 18, 1934
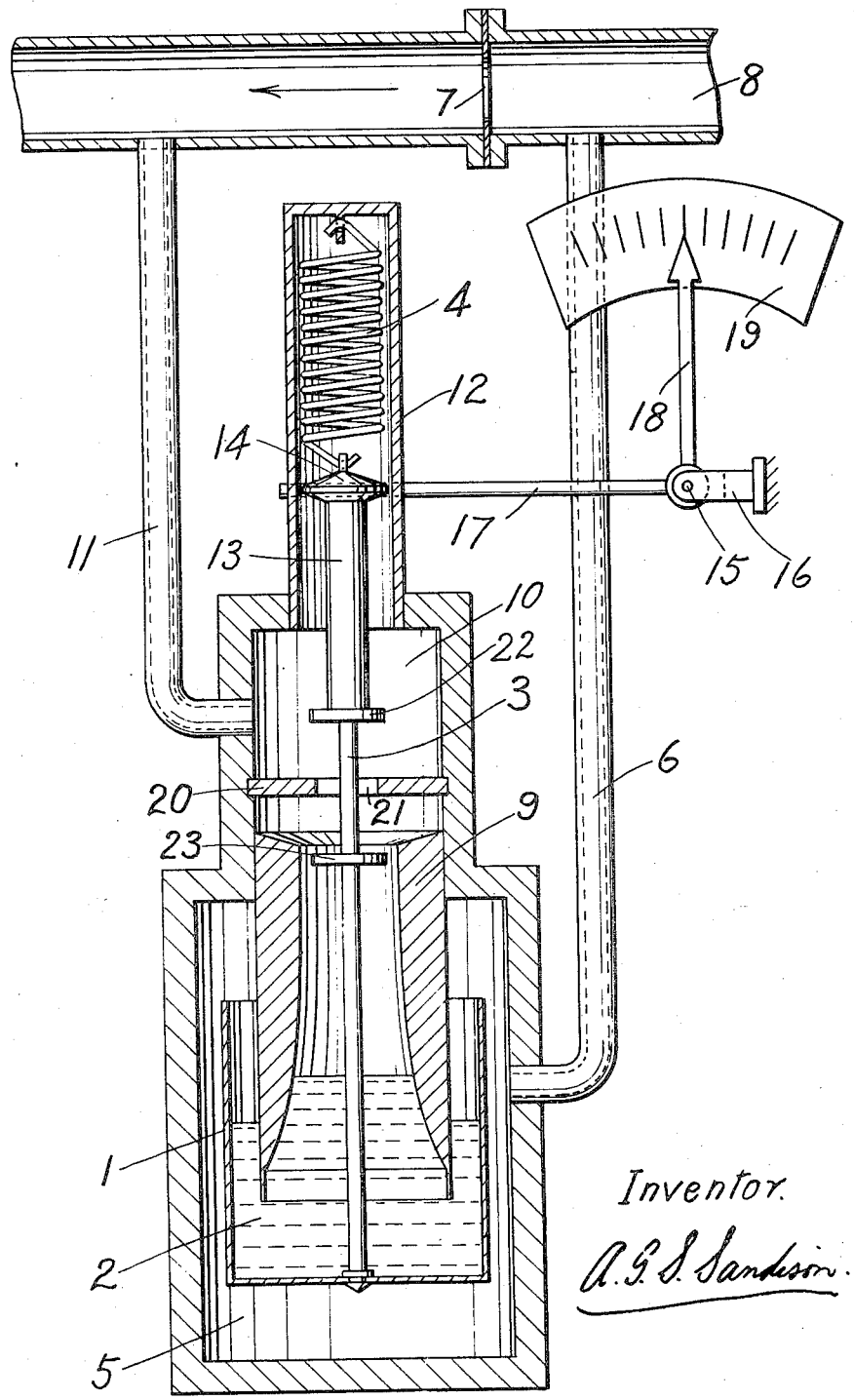
Inventor.
A.G.S.Sandison.

Patented Mar. 2, 1937

2,072,220

UNITED STATES PATENT OFFICE 2,072,220

FLUID FLOW METER

Alexander Greswolde Seymour Sandison, Kelda, Baltasound, Shetland, Great Britain Application August 18, 1934, Serial No. 740,511
In Great Britain September 25, 1933

2 Claims. (Cl. 73—31)

This invention relates to fluid flow meters of the pressure difference type wherein the flow of fluid is measured by measurement of the pressure difference produced by a Venturi tube, Pitot tube, orifice, or other pressure difference producing obstruction placed in the pipe or conduit in which the fluid is flowing.

An object of the invention is to provide a fluid flow meter of improved construction such that the moving parts in the portion of the meter that is under fluid pressure are so disposed and supported that they do not require to be constrained by guides or other mechanisms which may produce friction.

Another object of the invention is to provide a fluid flow meter such that the movement of the moving parts in the portion of the meter that is under fluid pressure may be transmitted to the external moving parts also in a frictionless manner.

A further object of the invention is to provide a fluid flow meter of improved construction and operation.

Fluid flow meters have previously been known in which the primary moving part comprises a movable container containing a sealing liquid into which a fixed bell depends, a pressure difference varying on variation of fluid flow being applied between the exterior and interior of the bell. Such mechanisms, however, have hitherto suffered from the disadvantage that the method of movably supporting the weight of the container has involved some form of guide liable to produce frictional error. In the present invention, however, the container is suspended from a spring which supports the weight of the container and at the same time permits movement, and in the preferred form of the invention the spring supports the container by means of a central rod passing through the bell so that the container in all positions is suspended in stable equilibrium and its movement need not be constrained by guides or other mechanism.

The invention is exemplified in the accompanying drawing which shows diagrammatically a sectional elevation of the preferred form of the invention.

A container 1 containing mercury or other suitable sealing liquid 2 is suspended by means of a rod 3 from a spring 4. The container 1 is located inside a chamber 5 the interior of which is connected by the pipe 6 to the high pressure side of an orifice 7 located in a pipe 8 the flow through which is being measured. The open end of a fixed bell member 9 depends into the container 1 and is sealed by the sealing liquid 2. The interior of the bell 9 is connected by the chamber 10 and pipe 11 to the low pressure side of the orifice 7. The upper portion of the chamber 10 consists of a non-magnetic tube 12 closed at the upper end. The upper portion of the rod 3 consists of a bar magnet 13 having a disk-shaped pole piece 14. A spindle 15 located externally to the pressure chambers of the meter is pivotally supported by the bracket 16 and carries an armature 17 registering with the pole piece 14 and a pointer 18 in juxtaposition to a scale 19.

The chamber 10 is divided by a disk 20 having a central opening 21 through which the rod 3 passes. Valve disks 22 and 23 are secured to the rod 3 above and below the disk 20, and seat on the disk 20 when the rod 3 is at the bottom or top of its travel respectively.

The initial adjustment is such that when there is no difference of pressure across the orifice the container 1 is in the lowest position of its normal operating range of travel.

In operation, on flow of fluid occurring through the pipe 8 a difference of pressure is caused by the orifice 7 so that the pressure in the chamber 5 is higher than that in chamber 10. The action of the pressure difference causes the container to rise until it reaches a new equilibrium position, the position depending on the value of the pressure difference. The armature 17 follows the movement of the magnet pole piece 14 and operates the pointer 18 to indicate the flow against the scale 19. It will be understood that the pointer 18 and scale 19 are merely an example of the means which may be used to make known the flow of fluid.

If the spring 4 is such that equal increments of strain occur for equal increments of stress, and if the bell 9 and container 1 are such that their horizontal cross-sections do not vary, the movement of the container will be linear in terms of the pressure difference. As the pressure difference varies approximately as the square of the flow of fluid the movement of the container will not then be linear in terms of the flow, but by suitably shaping the bell in a manner such as is shown in the drawing the movement of the container may be so modified as to be substantially linear in terms of flow over the greater portion of its travel.

If an excessive pressure difference across the bell 9 occurs from any cause the container 1 is forced to one or other of its extreme limits of travel and one or other of the disks 22 or 23 comes into contact with the seats of the disk 20, thus closing the opening 21 and preventing further displacement such as might cause spilling of the sealing liquid 2.

I claim:

1. In a fluid flow meter of the type wherein the flow is measured by measuring the pressure difference produced by an obstruction in the path of flow, the combination of a chamber subject to the pressure on one side of said obstruction, a movable container located within said chamber and containing a sealing liquid, a second chamber subject to the pressure on the other side of said obstruction, a bell forming an extension of said second chamber and extending into said container and sealed by said sealing liquid, a magnet located in said second chamber, securing means passing through said bell to secure said magnet to said container, a spring located in said second chamber having one end fixed and the other end attached to said magnet to give resilient support to said magnet and container so that said magnet and container may move on change of said pressure difference, an armature movably mounted external to said second chamber registering with and following the movement of said magnet, and means operated by said armature for making known the flow of fluid.

2. In a fluid flow meter of the type wherein the flow is measured by measuring the pressure difference produced by an obstruction in the path of flow, the combination of a chamber subject to the pressure on one side of said obstruction, a movable spring-supported container located within said chamber and containing a sealing liquid, a second chamber subject to the pressure on the other side of said obstruction and having a restriction with an opening therethrough, a bell extending into said container and sealed by said sealing liquid, the interior of said bell being connected to the interior of said second chamber by said opening, so that said container is caused to move on change of said pressure difference, a rod-like member secured to said container and extending through said bell and said opening and carrying means to close said opening when said container is at the limit of its travel, and means operated by said container for making known the rate of flow.

ALEXANDER GRESWOLDE

SEYMOUR SANDISON.